United States Patent
Lai

(10) Patent No.: US 11,348,211 B2
(45) Date of Patent: May 31, 2022

(54) IMAGE PROCESSING METHOD, DEVICE, ELECTRONIC APPARATUS AND COMPUTER READABLE STORAGE MEDIUM

(71) Applicant: TCL China Star Optoelectronics Technology Co., Ltd., Shenzhen (CN)

(72) Inventor: Chinghong Lai, Shenzhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 273 days.

(21) Appl. No.: 16/758,050

(22) PCT Filed: Dec. 27, 2019

(86) PCT No.: PCT/CN2019/129321
§ 371 (c)(1),
(2) Date: Apr. 22, 2020

(87) PCT Pub. No.: WO2021/120316
PCT Pub. Date: Jun. 24, 2021

(65) Prior Publication Data
US 2021/0407055 A1 Dec. 30, 2021

(30) Foreign Application Priority Data

Dec. 17, 2019 (CN) .......................... 201911301064.4

(51) Int. Cl.
*G06T 5/20* (2006.01)
*G06T 7/136* (2017.01)
*G06T 1/20* (2006.01)

(52) U.S. Cl.
CPC .................. *G06T 5/20* (2013.01); *G06T 1/20* (2013.01); *G06T 7/136* (2017.01); *G06T 2207/20012* (2013.01); *G06T 2207/20208* (2013.01)

(58) Field of Classification Search
CPC ....... G06T 5/00–50; G06T 7/136; G06T 1/20; G06T 2207/0012; G06T 2207/20208; G06N 3/0454
See application file for complete search history.

(56) References Cited

U.S. PATENT DOCUMENTS 10,460,416 B1 * 10/2019 Sirasao ............. H04N 21/2381
2005/0225670 A1 * 10/2005 Wexler ...................... G06T 1/20
348/441

(Continued)

FOREIGN PATENT DOCUMENTS

CN 109614866 4/2019
CN 109614896 4/2019

(Continued)

*Primary Examiner* — Sean T Motsinger

(57) ABSTRACT

An embodiment of the present invention provides an image processing method based on a convolution internet algorithm, a device, an electronic apparatus and a computer readable storage medium thereof. The method includes: determining a padding radius for each convolution calculation layer; summing the padding radiuses; acquiring an input image of a convolution internet algorithm; padding the input image to acquire a padded image according to the sum; determining a calculation range for each convolution calculation layer; implementing a convolution internet algorithm calculation to the padded image according to each convolution calculation layer; acquiring an output image. Image processing device, electronic apparatus, and computer readable storage medium of a convolution internet algorithm are provided. According to a technical solution of the present invention, repeated occupation of CPU or hardware calculation resources is reduced, encoding of codes is simplified, operation speed is enhanced, reducing economic costs and management difficulty is achieved.

10 Claims, 8 Drawing Sheets

(56) References Cited

U.S. PATENT DOCUMENTS

| | | | |
|---|---|---|---|
| 2018/0218502 A1* | 8/2018 | Golden | G06N 3/08 |
| 2019/0087725 A1 | 3/2019 | Yang et al. | |
| 2020/0257930 A1* | 8/2020 | Nahr | G06V 10/454 |
| 2020/0320752 A1* | 10/2020 | Chen | A61B 5/0042 |
| 2021/0056420 A1* | 2/2021 | Konishi | G06V 10/82 |
| 2021/0073642 A1* | 3/2021 | Dribus | G06N 5/003 |
| 2021/0073949 A1* | 3/2021 | Tagra | G06T 7/12 |

FOREIGN PATENT DOCUMENTS

| | | |
|---|---|---|
| CN | 109656623 | 4/2019 |
| CN | 110414472 | 11/2019 |

* cited by examiner

IMAGE PROCESSING METHOD, DEVICE, ELECTRONIC APPARATUS AND COMPUTER READABLE STORAGE MEDIUM

RELATED APPLICATIONS

This application is a National Phase of PCT Patent Application No. PCT/CN2019/129321 having International filing date of Dec. 27, 2019, which claims the benefit of priority of Chinese Patent Application No. 201911301064.4 filed on Dec. 17, 2019. The contents of the above applications are all incorporated by reference as if fully set forth herein in their entirety.

FIELD AND BACKGROUND OF THE INVENTION

The present invention relates to a field of image processing technologies, specifically relates to a convolution internet algorithm pre-padding method, a device, an electronic apparatus and a computer readable storage medium thereof.

Convolution internet technologies are increasingly applied in artificial intelligence, and are especially applied in display fields for super high resolution image algorithm to effectively enhance the image quality of a display system. However, for a convolution internet algorithm, in general circumstances it is required to implement convolution padding to an input image or an intervening image. In a pure hardware system, generally hardware is directly employed to implement padding operation. In a software and hardware cooperation system, padding operation can be implemented in a software system or a hardware system. FIG. 1 shows a flowchart of a common conventional image padding method by a convolution internet algorithm. However, according to a general padding image processing method of a convolution internet algorithm, the padding operation implemented in either the software system or the hardware system, has issues of repeated occupation to a central process unit (CPU) or hardware calculation resources, and complicated encoding for soft and hardware codes.

SUMMARY OF THE INVENTION

Technical Issue

Accordingly, the present invention provides an image processing method, a device and a computer readable storage medium thereof to reduce repeated occupation to calculation source of a central process unit (CPU) or hardware, simplify encoding of codes, and increase operation speed.

Technical Solution

The embodiment of the present invention provides technical solutions as follows.

According to an aspect of the present invention providing an image processing method, comprising:

determining a padding radius $R_1, R_2, \ldots, R_{(n-1)}, R_n$ required by each of convolution calculation layers $L_1, L_2, \ldots, L_{(n-1)}, L_n$, wherein n is greater than or equal to 2;

calculating a sum $R_\Sigma$ of the padding radiuses $R_1, R_2, \ldots, R_n$ of the convolution calculation layers $L_1, L_2, \ldots, L_{(n-1)}, L_n$;

acquiring an input image $P_0$ of a convolution internet algorithm;

padding the input image $P_0$ for one time and acquiring a padded image $P_{0\Sigma}$ according to the sum $R_\Sigma$ of the padding radiuses $R_1, R_2, \ldots, R_n$;

determining a calculation range of each of the convolution calculation layers $L_1, L_2, \ldots, L_{(n-1)}, L_n$;

implementing, according to a first one $L_1$ of the convolution calculation layers $L_1, L_2, \ldots, L_{(n-1)}, L_n$ and one of the calculation ranges corresponding to the first one $L_1$, a convolution internet algorithm calculation to the padded image $P_{0\Sigma}$, and then acquiring an image $P_{1\Sigma}$;

sequentially implementing, according to a rest of the convolution calculation layers $L_1, L_2, \ldots, L_{(n-1)}, L_n$ other than the first one $L_1$ and the calculation ranges corresponding to the rest of the convolution calculation layers $L_1, L_2, \ldots, L_{(n-1)}, L_n$, convolution internet algorithm calculations to the image $P_{(n-1)\Sigma}$ acquired by implementing the convolution internet algorithm calculation, and acquiring images $P_{n\Sigma}$ acquired by sequentially implementing the convolution internet algorithm calculations; and employing the image acquired by implementing the convolution internet algorithm calculation according to the last one of the convolution calculation layers $L_1, L_2, \ldots, L_{(n-1)}, L_n$ as an output image, and outputting the output image.

Furthermore the step of determining the padding radius $R_1, R_2, \ldots, R_n$ required by each of the convolution calculation layers $L_1, L_2, \ldots, L_{(n-1)}, L_n$ comprises a step of analyzing the convolution internet algorithm.

Furthermore, the step of determining the calculation range of each of the convolution calculation layers $L_1, L_2, \ldots, L_{(n-1)}, L_n$ comprises determining the calculation range according to the padded image $P_{0\Sigma}$ acquired by padding the input image $P_0$ for one time.

Furthermore, the step of determining the calculation range of each of the convolution calculation layers $L_1, L_2, \ldots, L_{(n-1)}, L_n$ comprises determining the calculation range according to the padding radius $R_1, R_2, \ldots, R_n$ required by each of the convolution calculation layers $L_1, L_2, \ldots, L_{(n-1)}, L_n$ and/or the input image $P_0$.

According to another aspect of the present invention, an image processing device based on a convolution internet algorithm is provided and comprises:

a padding radius calculation module configured to determine a padding radius $R_1, R_2, \ldots, R_n$ required by each of convolution calculation layers $L_1, L_2, \ldots, L_{(n-1)}, L_n$, wherein the convolution calculation layers $L_1, L_2, \ldots, L_{(n-1)}, L_n$ are at least two;

a pre-padding radius calculation module configured to calculate a sum $R_\Sigma$ of the padding radiuses $R_1, R_2, \ldots, R_n$ of the convolution calculation layers $L_1, L_2, \ldots, L_{(n-1)}, L_n$;

an image input module configured to acquire an input image $P_0$ of a convolution internet algorithm;

a pre-padding module configured to pad the input image $P_0$ for one time and acquire a padded image $P_{0\Sigma}$ according to the sum $R_\Sigma$ of the padding radiuses $R_1, R_2, \ldots, R_n$;

a calculation range determination module configured to determine a calculation range of each of the convolution calculation layers $L_1, L_2, \ldots, L_{(n-1)}, L_n$;

a convolution internet calculation module configured to implement, according to a first one $L_1$ of the convolution calculation layers $L_1, L_2, \ldots, L_{(n-1)}, L_n$ and one of the calculation ranges corresponding to the first one $L_1$, a convolution internet algorithm calculation to the padded image $P_{0\Sigma}$, and then acquiring an image $P_{1\Sigma}$, and configured to sequentially implement, according to a rest of the convolution calculation layers $L_1, L_2, \ldots, L_{(n-1)}, L_n$ other than the first one $L_1$ and the calculation ranges corresponding to the rest of the convolution calculation layers $L_1, L_2, \ldots,$ $L_{(n-1)}$, $L_n$, convolution internet algorithm calculations to the image $P_{(n-1)\Sigma}$ acquired by implementing the convolution internet algorithm calculation, and acquiring images acquired by sequentially implementing the convolution internet algorithm calculations; and an image output module configured to employ the image acquired by implementing the convolution internet algorithm calculation according to the last one of the convolution calculation layers $L_1$, $L_2$, ..., $L_{(n-1)}$, $L_n$ as an output image, and to output the output image.

Furthermore, a step of determining the padding radius $R_1$, $R_2$, ..., $R_n$ required by each of the convolution calculation layers $L_1$, $L_2$, ..., $L_{(n-1)}$, $L_n$, performed by the padding radius calculation module, comprises analyzing the convolution internet algorithm.

Furthermore, a step of determining the calculation range of each of the convolution calculation layers $L_1$, $L_2$, ..., $L_{(n-1)}$, $L_n$, performed by the calculation range determination module, comprises determining the calculation range according to the padded image $P_{0\Sigma}$ acquired by padding the input image $P_0$ for one time.

According to another aspect of the present invention, an electronic apparatus is provided and comprises a processor, a communication interface, a memory, and a communication bus, wherein the processor, the communication interface, and the memory completes communication therebetween through the communication bus;

wherein the memory is configured to store computer programs;

wherein the processor is configured to implement the computer programs stored in the memory to achieve the steps of the method as described above.

According to another aspect of the present invention, a computer readable storage medium is provided, and the computer readable storage medium stores instructions, when operating on a computer, the computer readable storage medium drives the computer implement the image processing method as described above.

Advantages

According to the technical solution of the present invention, because a technical solution of one-time pre-filling instead of multi-pre-filling is employed, in one aspect, not only repeated occupation to calculation source of a central process unit (CPU) or hardware is reduced, but also complexity of encoding codes is lowered to simplify encoding of the codes. Because occupation of the hardware resources and code complexity are lowered and calculation speed is enhanced, reducing economic costs and management difficulty is achieved. Of course, it is not necessary to achieve all of the above advantages when any product or method of the present invention is embodied.

BRIEF DESCRIPTION OF THE SEVERAL VIEWS OF THE DRAWINGS

To more clearly elaborate on the technical solutions of embodiments of the present invention or prior art, appended figures necessary for describing the embodiments of the present invention or prior art will be briefly introduced as follows. Apparently, the following appended figures are merely some embodiments of the present invention. A person of ordinary skill in the art may acquire other figures according to the appended figures without any creative effort.

The components in the drawings are not drawn to scale, but only to show the principle of the present invention. In order to facilitate the illustration and description of some parts of the present invention, the corresponding parts in the drawings may be enlarged. In other words, relative to other components in the exemplary device actually manufactured according to the present invention, those components become larger. In the drawings, the same or similar technical features or components will be denoted by the same or similar reference numerals.

DESCRIPTION OF SPECIFIC EMBODIMENTS OF THE INVENTION

The technical solution in the embodiment of the present invention will be clearly and completely described below with reference to the accompanying drawings in the embodiments of the present invention. Apparently, the described embodiments are merely some embodiments of the present invention instead of all embodiments. According to the embodiments in the present invention, all other embodiments obtained by those skilled in the art without making any creative effort shall fall within the protection scope of the present invention.

First Embodiment

Figure 1:
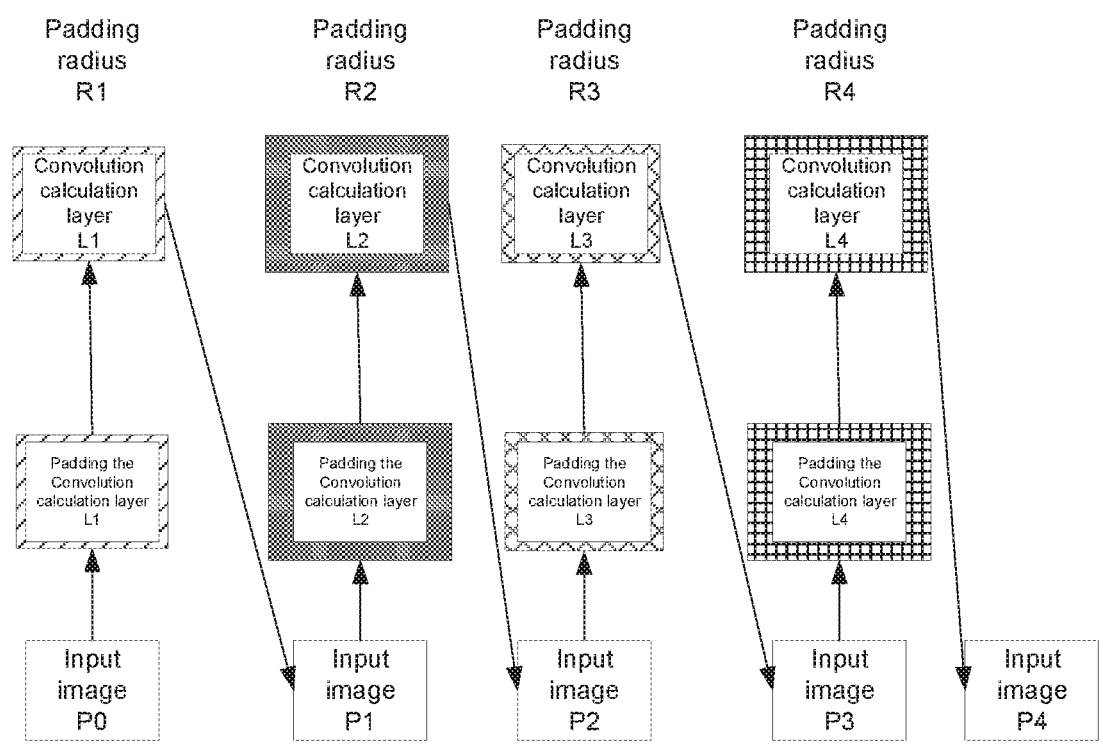
FIG. 1 illustrates a diagram of a common conventional image padding method by a convolution internet algorithm.
Figure 2:
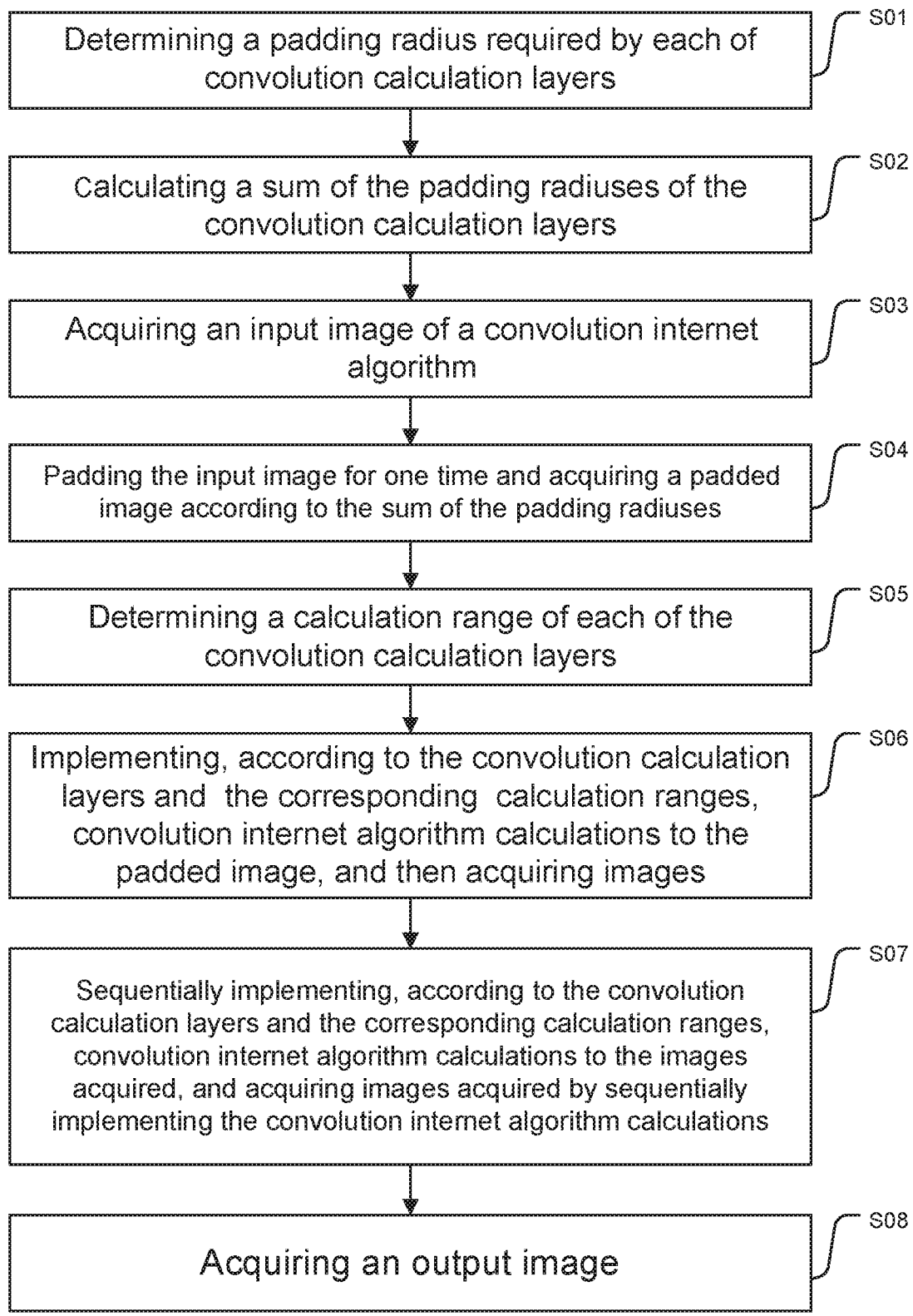
FIG. 2 illustrates a flowchart of a pre-padding image processing method of a convolution internet algorithm according to an embodiment of the present invention.

According to a first embodiment of the present invention, a pre-padding image processing method of a convolution internet algorithm is provided. FIG. 2 illustrates a flowchart of a pre-padding image processing method of a convolution internet algorithm according to an embodiment of the present invention. With reference to FIG. 2, the method comprises steps S01 to S08.

The step S01 comprises determining a padding radius $R_1$, $R_2$, ..., $R_{(n-1)}$, $R_n$ required by each of convolution calculation layers $L_1$, $L_2$, ..., $L_{(n-1)}$, $L_n$, wherein n is greater than or equal to 2;

The step S02 comprises calculating a sum $R_\Sigma$ of the padding radiuses $R_1$, $R_2$, ..., $R_n$ of the convolution calculation layers $L_1$, $L_2$, ..., $L_{(n-1)}$, $L_n$;

The step S03 comprises acquiring an input image $P_0$ of a convolution internet algorithm;

The step S04 comprises padding the input image $P_0$ for one time and acquiring a padded image $P_{0\Sigma}$ according to the sum $R_\Sigma$ of the padding radiuses $R_1, R_2, \ldots, R_n$;

The step S05 comprises a calculation range of each of the convolution calculation layers $L_1, L_2, \ldots, L_{(n-1)}, L_n$;

The step S06 comprises implementing, according to a first one $L_1$ of the convolution calculation layers $L_1, L_2, \ldots, L_{(n-1)}, L_n$ and one of the calculation ranges corresponding to the first one $L_1$, a convolution internet algorithm calculation to the padded image $P_{0\Sigma}$, and then acquiring an image $P_{1\Sigma}$;

The step S07 comprises sequentially implementing, according to a rest of the convolution calculation layers $L_1, L_2, \ldots, L_{(n-1)}, L_n$ other than the first one $L_1$ and the calculation ranges corresponding to the rest of the convolution calculation layers $L_1, L_2, \ldots, L_{(n-1)}, L_n$, convolution internet algorithm calculations to the image $P_{(n-1)\Sigma}$ acquired by implementing the convolution internet algorithm calculation, and acquiring images $P_{n\Sigma}$ acquired by sequentially implementing the convolution internet algorithm calculations;

The step S08 comprises employing the image $P_{n\Sigma}$ as an output image, and outputting the output image.

The convolution calculation layers are at least two, with reference to FIGS. 3-6, total two layers of the convolution calculation layers and total four layers of the convolution calculation layers are taken as examples to further explain the pre-padding image processing method of the convolution internet algorithm.

Figure 3:
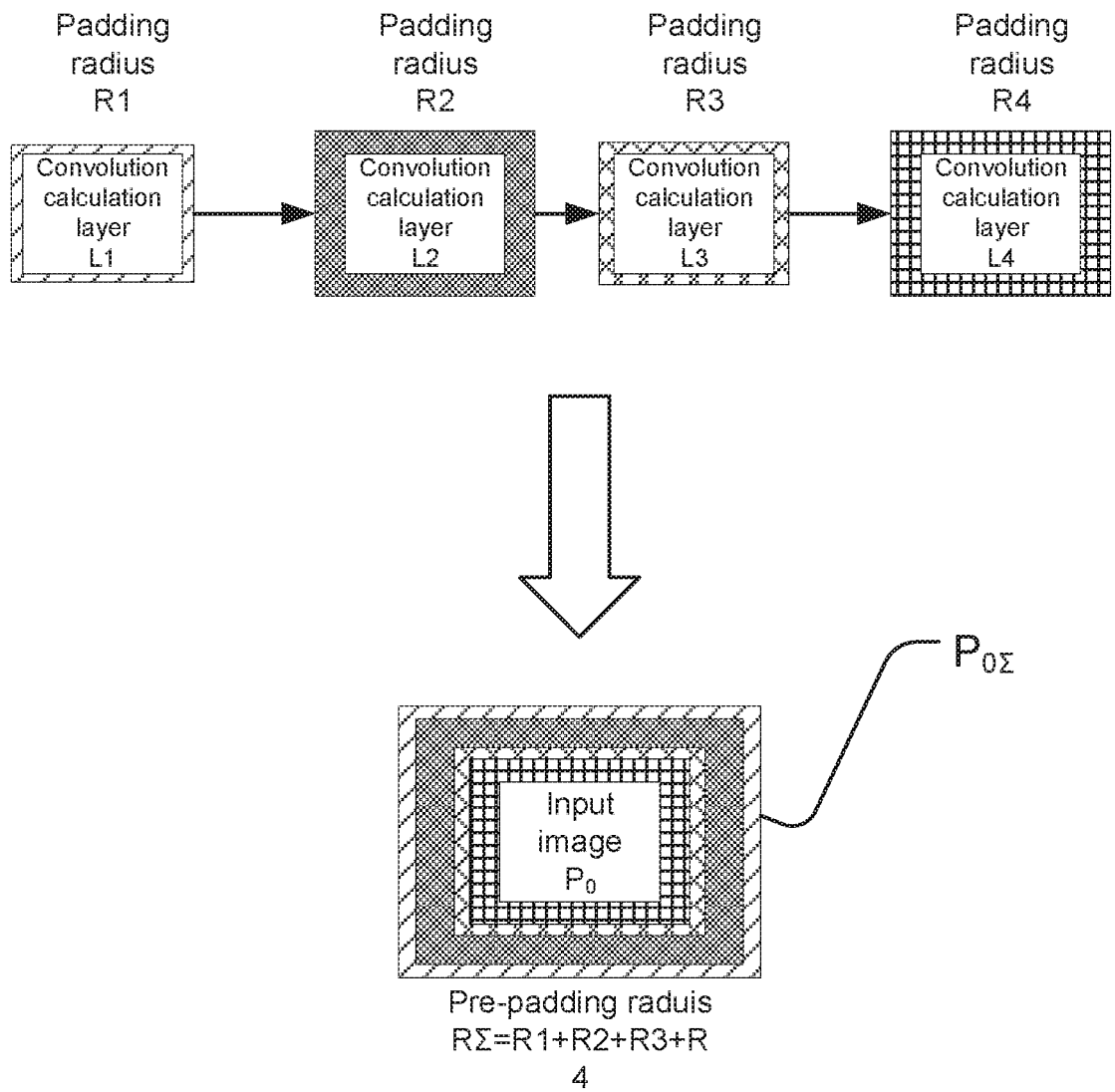
FIG. 3 illustrates a specific schematic diagram of some of steps of the pre-padding image processing method of the convolution internet algorithm according to an embodiment of the present invention.

FIG. 3 illustrates a specific process of steps S01, S02, S03, and S04 of the pre-padding image processing method of the convolution internet algorithm including total four layers of convolution calculation layers.

With reference to FIG. 3, the convolution calculation layer $L_1$ requires 3×3 convolution calculations to determine that the padding radius $R_1$ required is 1; the convolution calculation layer $L_2$ requires 5×5 convolution calculations to determine that the padding radius $R_2$ required is 2; the convolution calculation layer $L_3$ requires 3×3 convolution calculations to determine that the padding radius $R_1$ is 1; the convolution calculation layer $L_4$ requires 9×9 convolution calculations to determine that the padding radius $R_1$ required is 4.

The padding radiuses $R_\Sigma$ required by the convolution calculation layers is calculated as follows: $R_\Sigma = R_1 + R_2 + R_3 + R_4 = 1+2+1+4=8$.

After an input image of a convolution internet algorithm $P_0$, a one-time pre-padding with a radius being 8 is implemented to the input image $P_0$ to acquire a padded image $P_{0\Sigma}$.

Figure 4:
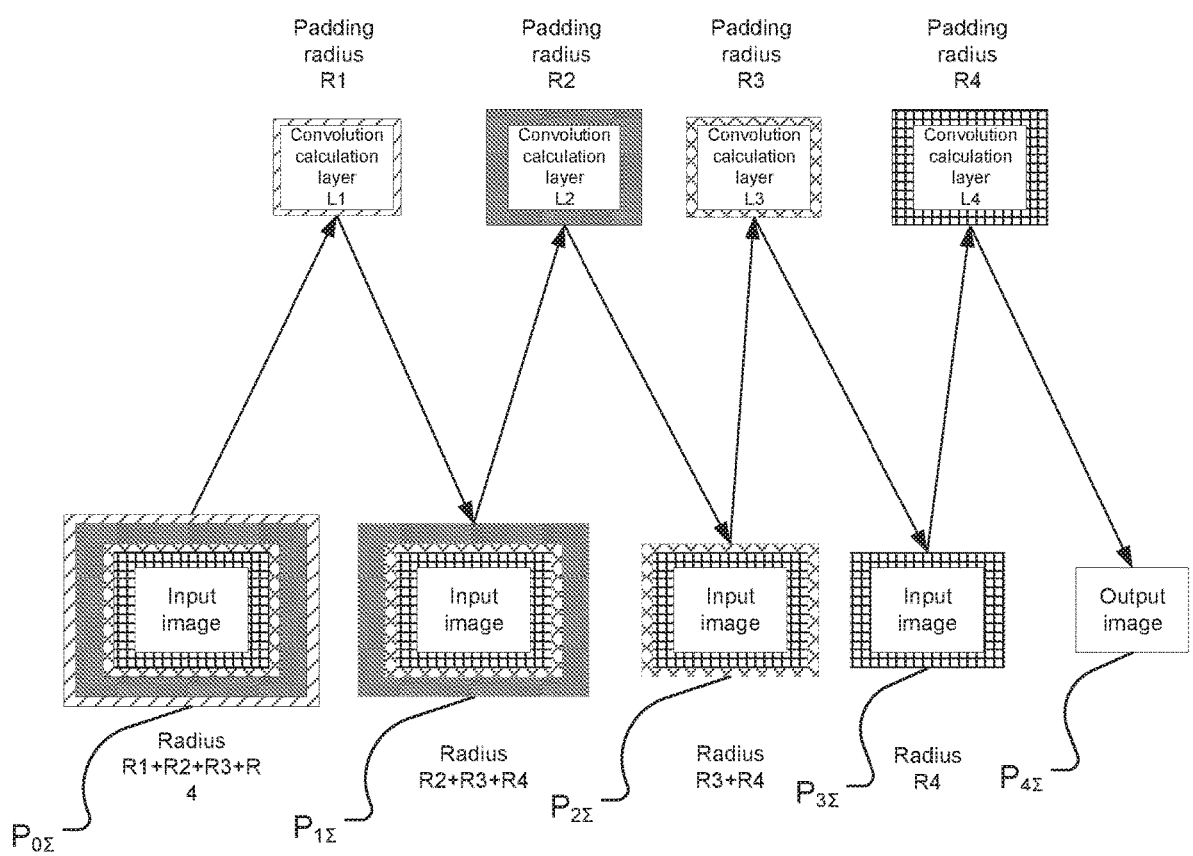
FIG. 4 illustrates a specific schematic diagram of some of steps of the pre-padding image processing method of the convolution internet algorithm according to an embodiment of the present invention.

FIG. 4 illustrates a specific process of steps S05, S06, S07, and S08 of the pre-padding image processing method of the convolution internet algorithm including total four layers of convolution calculation layers.

With reference to FIG. 4, a calculation range of each of the convolution calculation layers $L_1, L_2, L_3, L_4$ is determined.

According to the convolution calculation layer $L_1$ and a corresponding calculation range, a convolution internet algorithm calculation is implemented to the padded image $P_{0\Sigma}$ to acquire an image $P_{1\Sigma}$ acquired by the calculation.

According to the convolution calculation layer $L_2$ and a corresponding calculation range, a convolution internet algorithm calculation is implemented to the image $P_{1\Sigma}$ acquired by the calculation to acquire an image $P_{2\Sigma}$ acquired by the calculation.

According to the convolution calculation layer $L_3$ and a corresponding calculation range, a convolution internet algorithm calculation is implemented to the image $P_{2\Sigma}$ acquired by the calculation to acquire an image $P_{3\Sigma}$ acquired by the calculation.

According to the convolution calculation layer $L_4$ and a corresponding calculation range, a convolution internet algorithm calculation is implemented to the image $P_{3\Sigma}$ acquired by the calculation to acquire an image $P_{4\Sigma}$ acquired by the calculation.

$P_{4\Sigma}$ serves as an output image and is outputted.

The above method for determining the calculation range of each of the convolution calculation layers $L_1, L_2, L_3, L_4$ is analyzing a corresponding one of the convolution calculation layers.

The above method for determining the calculation range of each of the convolution calculation layers $L_1, L_2, L_3, L_4$ is determining the calculation range according to the padded image $P_{0\Sigma}$ acquired by padding the input image for one time.

Figure 5:
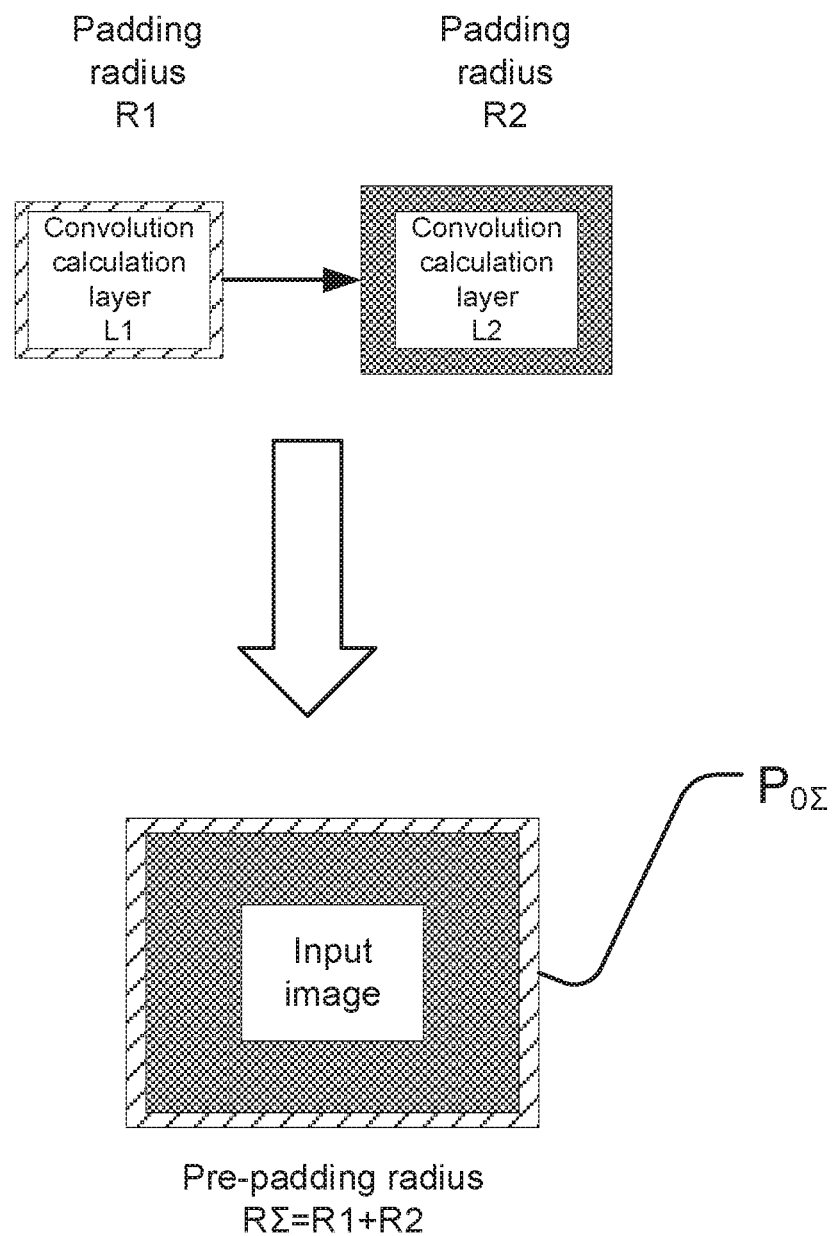
FIG. 5 illustrates a specific schematic diagram of some of steps of the pre-padding image processing method of the convolution internet algorithm according to an embodiment of the present invention.

FIG. 5 illustrates a specific process of steps S01, S02, S03, and S04 of the pre-padding image processing method of the convolution internet algorithm including total two layers of convolution calculation layers.

With reference to FIG. 5, the convolution calculation layers $L_1$ requires 3×3 convolution calculations to determine that the padding radius $R_1$ required is 1; the convolution calculation layers $L_2$ requires 5×5 convolution calculations to determine the padding radius $R_2$ required is 2.

The padding radius $R_\Sigma$ required by the convolution calculation layers is calculated as follows: $R_\Sigma = R_1 + R_2 = 1+2=3$.

After an input image of a convolution internet algorithm $P_0$, a one-time pre-padding with a radius being 3 is implemented to the input image $P_0$ to acquire a padded image $P_{0\Sigma}$.

Figure 6:
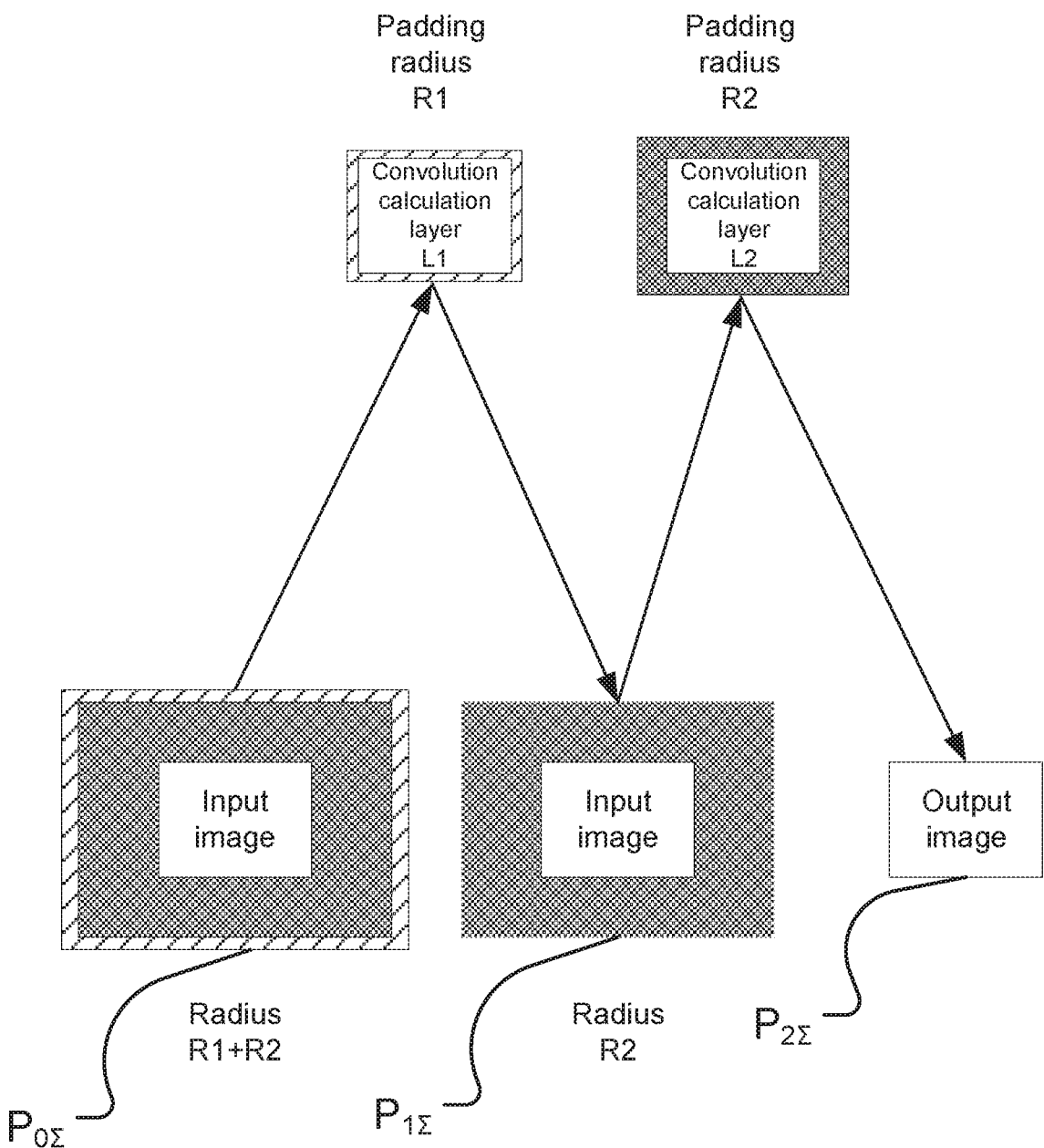
FIG. 6 illustrates a specific schematic diagram of some of steps of the pre-padding image processing method of the convolution internet algorithm of according to an embodiment of the present invention.

FIG. 6 illustrates a specific process of steps S05, S06, S07, and S08 of the pre-padding image processing method of the convolution internet algorithm including total two layers of convolution calculation layers.

With reference to FIG. 6, a calculation range of each of the convolution calculation layers $L_1, L_2$ is determined.

According to the convolution calculation layer $L_1$ and a corresponding calculation range, a convolution internet algorithm calculation is implemented to the padded image $P_{0\Sigma}$ to acquire an image $P_{1\Sigma}$ acquired by the calculation.

According to the convolution calculation layer $L_2$ and a corresponding calculation range, a convolution internet algorithm calculation is implemented to the image $P_{1\Sigma}$ acquired by the calculation to acquire an image $P_{2\Sigma}$ acquired by the calculation.

$P_{2\Sigma}$ serves as an output image and is outputted.

The above method for determining the calculation range of each of the convolution calculation layers $L_1, L_2$ is analyzing a corresponding one of the convolution calculation layers.

The above method for determining the calculation range of each of the convolution calculation layers $L_1, L_2$ is determining the calculation range according to the padding radius $R_1, R_2$ required by each of the convolution calculation layers $L_1, L_2$ and/or the input image $P_0$.

Second Embodiment

Figure 7:
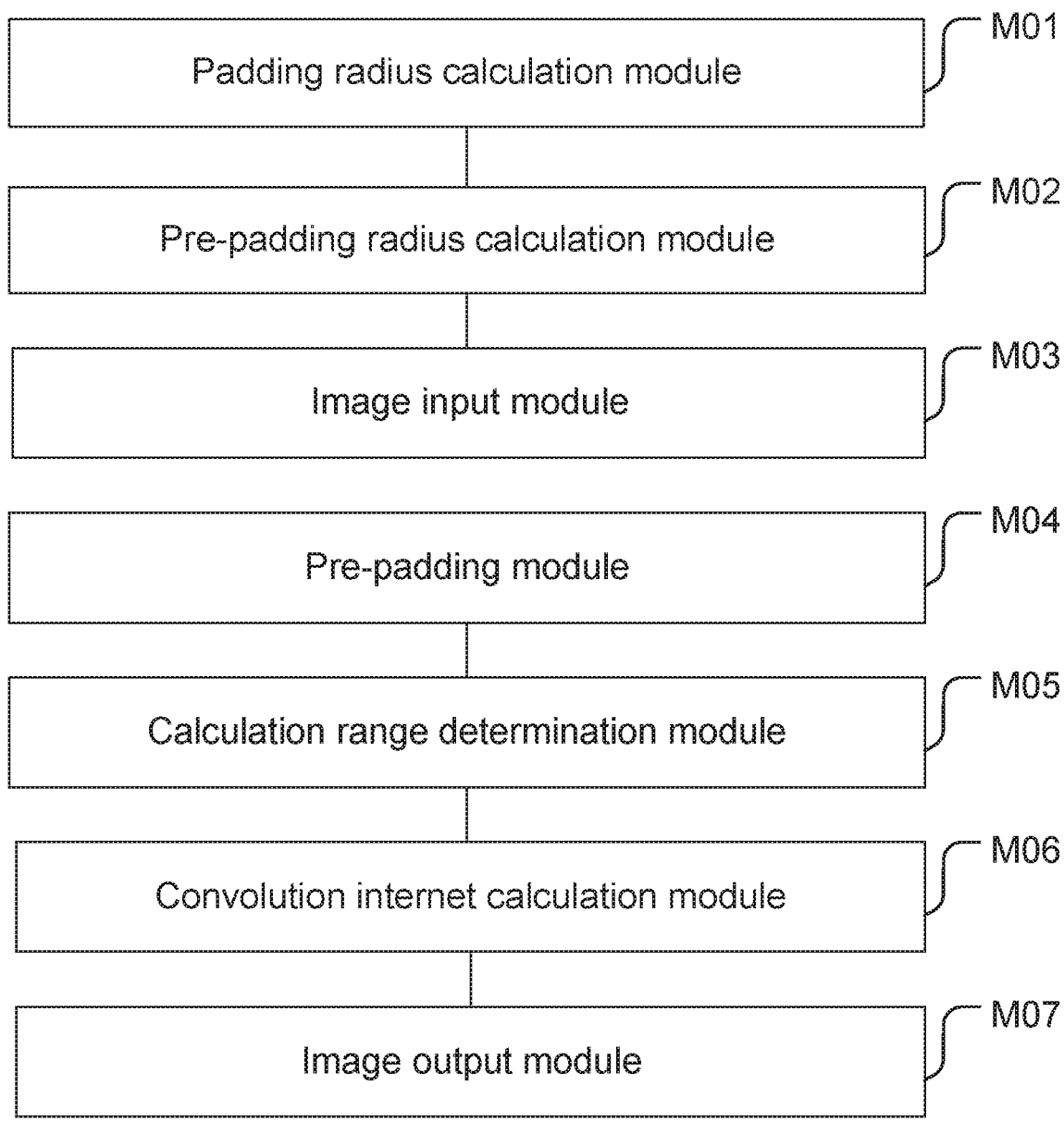
FIG. 7 illustrates a schematic structural view of a pre-padding image processing device of a convolution internet algorithm according to an embodiment of the present invention.

According to an embodiment of the present invention second, a pre-padding image processing device of a convolution internet algorithm is provided. FIG. 7 illustrates a schematic structural view of a pre-padding image processing device of a convolution internet algorithm according to an embodiment of the present invention. As shown in FIG. 7, the device comprises:

a padding radius calculation module M01 configured to determine a padding radius $R_1, R_2, \ldots, R_{(n-1)}, R_n$ required by each of convolution calculation layers $L_1, L_2, \ldots, L_{(n-1)}, L_n$;

a pre-padding radius calculation module M02 configured to calculate a sum $R_\Sigma$ of the padding radiuses $R_1, R_2, \ldots, R_n$ required by each of the convolution calculation layers;

an image input module M03 configured to acquire an input image of a convolution internet algorithm $P_0$;

a pre-padding module M04 configured to pad the input image $P_0$ for one time and acquire a padded image $P_{0\Sigma}$ according to the sum $R_\Sigma$ of the padding radiuses;

a calculation range determination module M05 configured to determine a calculation range of each of the convolution calculation layers $L_1, L_2, \ldots, L_{(n-1)}, L_n$;

a convolution internet calculation module M06 configured to implement, according to a first one $L_1$ of the convolution calculation layers $L_1, L_2, \ldots, L_{(n-1)}, L_n$ and one of the calculation ranges corresponding to the first one $L_1$, a convolution internet algorithm calculation to the padded image $P_{0\Sigma}$, and then acquiring an image $P_{1\Sigma}$, and configured to sequentially implement, according to a rest of the convolution calculation layers $L_1, L_2, \ldots, L_{(n-1)}, L_n$ other than the first one $L_1$ and the calculation ranges corresponding to the rest of the convolution calculation layers $L_1, L_2, \ldots, L_{(n-1)}, L_n$, convolution internet algorithm calculations to the image $P_{(n-1)\Sigma}$ acquired by implementing the convolution internet algorithm calculation, and acquiring images acquired by sequentially implementing the convolution internet algorithm calculations; and an image output module M07 configured to employ the image acquired by implementing the convolution internet algorithm calculation according to the last one of the convolution calculation layers $L_1, L_2, \ldots, L_{(n-1)}, L_n$ as an output image, and to output the output image.

A step of determining the padding radius $R_1, R_2, \ldots, R_n$ required by each of the convolution calculation layers $L_1, L_2, \ldots, L_{(n-1)}, L_n$, performed by the padding radius calculation module, comprises analyzing the convolution internet algorithm.

A step of determining the calculation range of each of the convolution calculation layers $L_1, L_2, \ldots, L_{(n-1)}, L_n$, performed by the calculation range determination module, comprises determining the calculation range according to the padded image $P_{0\Sigma}$ acquired by padding the input image $P_0$ for one time.

a step of determining the calculation range of each of the convolution calculation layers $L_1, L_2, \ldots, L_{(n-1)}, L_n$, performed by the calculation range determination module, can also be determining the calculation range according to the padding radius $R_1, R_2, \ldots, R_{(n-1)}, R_n$ required by each of the convolution calculation layers $L_1, L_2, \ldots, L_{(n-1)}, L_n$ and/or the input image $P_0$.

The above image output module can be a display module or a communication module, and can visualize and present an image or transmit the image to the next processing station. If the image output module uses a communication module, various communication standards, protocols, and technologies can be used. Such communication standards, protocols, and technologies include but are not limited to Global System for Mobile Communication (GSM), (Enhanced Data GSM Environment (EDGE), wideband code division multiple access (WCDMA), code division access (CDMA), time division multiple access (TDMA), wireless fidelity (Wi-Fi) (for example USA Institute of Electrical and Electronics Engineers standards including IEEE 802.11a, IEEE 802.11b, IEEE 802.11g and/or IEEE 802.11n), voice over internet protocol (VoIP), worldwide interoperability for microwave access (Wi-Max), other protocols for mails, instant messaging, and short messages, and any other suitable communication protocols, and even protocols currently under development are included.

Third Embodiment

Figure 8:
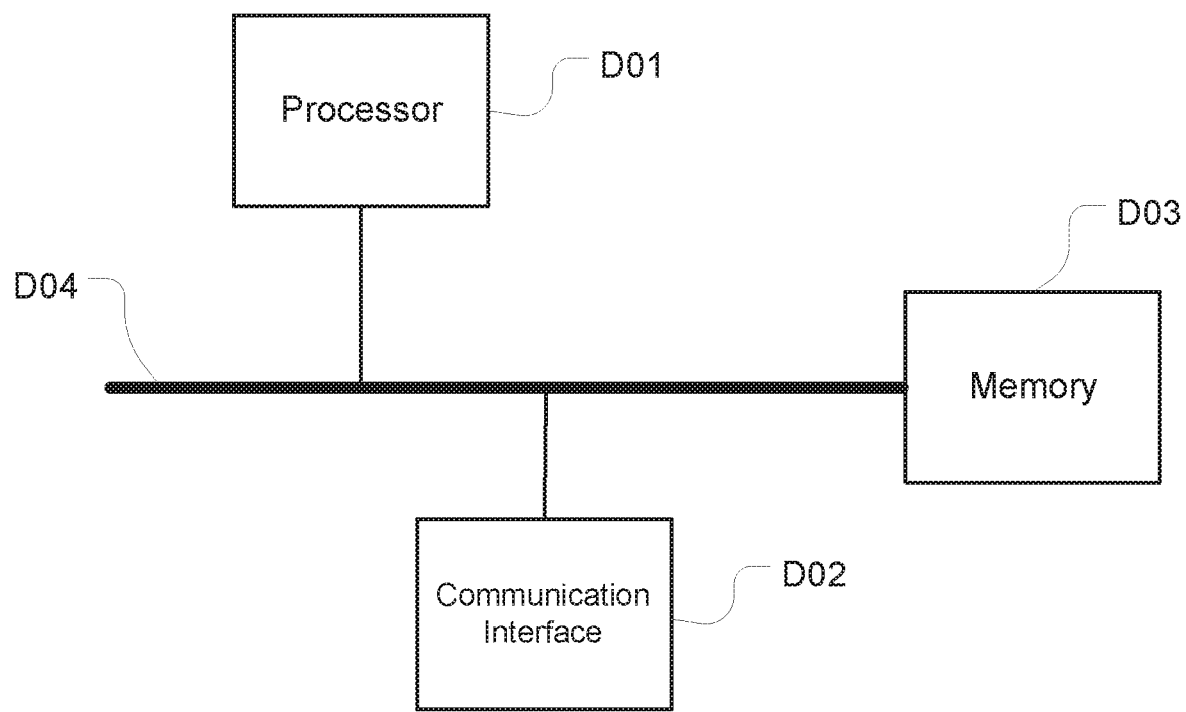
FIG. 8 illustrates a schematic structural view of the convolution internet algorithm pre-padding image processing electronic apparatus according to an embodiment of the present invention.

According to the embodiment of the present invention third, an electronic apparatus is provided, with reference to FIG. 8, and comprises a processor D01, communication interface D02, a memory D03, and a communication bus D04. The processor D01, the communication interface D02, and the memory D03 achieves mutual communication through the communication bus D04.

The memory D03 is configured to store computer programs;

The processor D01 is configured to implement the computer programs stored in the memory to achieve any one of the steps of the above method.

The memory D03 can comprise a high speed random access memory, and can also comprise a non-volatile memory, for example, one or more magnetic storage devices, flash ram, or other non-volatile solid memory. In some examples, the memory D03 can further comprise a memory remotely disposed relative to the processor D01. Such remote memory can be connected to a mobile terminal through internet. The communication bus of the above electronic apparatus can be a peripheral component interconnect (PCI) bus or an extended industry standard architecture (EISA) bus. The communication bus can be an address bus, a data bus, and a control bus. For convenience of expression, only a thick line is illustrated in the figure, but there can be more than one bus or more than one type of a bus. The communication interface is configured for communication among the above electronic apparatus and other devices. The memory can random access memory (RAM), can also comprise a non-volatile memory, for example at least one disk memory. Furthermore, memory can be at least one storage device remotely disposed from the processor. The above processor can be a general processor, including a central processing unit (CPU), or a network processor (NP), and can also be a digital signal processing (DSP), an application specific integrated circuit (ASIC), a field-programmable gate array (FPGA) or other compliable logic device, a discrete door, or a transistor logic device, a discrete hardware assembly.

It should be understood by a person of ordinary skill in the art that the structures shown in FIG. 8 do not form a limitation to the electronic apparatus, and more or less parts than those shown in the figure, an assembly of some parts, or a different arrangement of parts can be included.

Fourth Embodiment

In another embodiment of the present invention, a computer readable storage medium is also provided. The computer readable storage medium is stored with instructions. When operating on a computer, the computer readable storage medium drives the computer implement any one of the image processing method as described above. The above embodiment can be achieved fully or partially through software, hardware, firmware or a combination thereof. When it is achieved by software, and can be fully or partially achieved in form of computer program products. Computer program products include one or more computer instructions. When the above computer program instructions are loaded and operate on the computer, all or some of processes or functions of the embodiment of the present invention are generated. The computer can be general computer, an exclusive computer, computer internet, or other programmable device. The computer instructions can be stored in the computer readable storage medium, or can be transmitted from one computer readable storage medium to another computer readable storage medium. For example, computer instructions can be transmitted from a website point, computer, server, or data center through wires (for example, coaxial cable, optical fiber, digital subscriber line (DSL)) or wireless (for example, infrared, wireless, microwave, etc.) to another website point, computer, server, or data center. The above computer readable storage medium can be any usable medium that the computer can access, or can include a data storage device such as one or more usable medium integrated servers, data centers. The above usable medium can be a magnetic medium (for example, floppy disc, hard disk, tape), an optic medium (for example, DVD), or a semiconductor medium (for example, solid state disk (SSD)).

It should be explained that the terms "first" and "second" are used for descriptive purposes only and are not to be construed as indicating or implying a relative importance or implicitly indicating the number of technical features indicated. Thus, a feature defining "first", "second" may explicitly or implicitly include one or more of the characteristics. In the description of the present invention, unless otherwise stated, "a plurality of" means two or more. In addition, the term "comprise" and any variant thereof is intended to cover non-exclusive inclusion such that a process, method, article, or apparatus including a series of elements not only includes those elements, but also includes other elements not explicitly listed out, or further comprises elements inherently included by such process, method, article or apparatus. Without further restrictions, the elements defined by the syntax "comprises a . . . ", do not exclude the existence of the same elements in the process, method, article or equipment that includes the above elements. Each embodiment in the specification is described in a related manner, and the same and similar parts of each embodiment can be referred to each other. Each embodiment highlights the differences from other embodiment. In particular, for device and electronic apparatus embodiment. In other words, since it is basically similar to the method embodiment, the description is relatively simple. Related details refer to the description of the method embodiment. The above descriptions are only the preferred embodiments of the present invention, and are not intended to limit the present invention. Any modifications, equivalents, and improvements made within the spirit and scope of the present invention should be included in the protective extent of the present invention. In the above description of specific embodiments of the present invention, a feature illustrated and/or described for an embodiment can be used in one or more other embodiments through identical or similar manners, can be combined with other features in the other embodiments, or can be used to replace the features in other embodiments.

In the present invention, the word "exemplary" is used to mean "serving as an example, illustration or description". Any embodiment described as "exemplary" in the present invention is not necessarily construed as preferred or more advantageous over other embodiments. In order to enable any person skilled in the art to implement and use the present invention, the following description is given. In the following description, details are set forth for the purpose of explanation. It should be understood that a person of ordinary skill in the art will appreciate that the present invention may be implemented without the use of these specific details. In other instances, the known structures and processes are not elaborated to avoid unnecessary details from making descriptions of the present invention becomes ambiguous. Therefore, the present invention is not intended to be limited to the illustrated embodiment, but is consistent with the broadest scope of the principles and features disclosed by the present invention.

It should be emphasized that the term "comprise/include" as used herein refers to the presence of features, elements, steps or components, but does not exclude the presence or addition of one or more of the other features, elements, steps or components. Ordinal terms or subscripts "one", "two", "1", "2", "n", "n-", etc. do not necessarily indicate the features, elements, steps or components in the implementation order or degree of importance. It is only used to identify these features, elements, steps or components for the sake of clarity.

Although the embedment of the present invention is described with reference to the accompanying drawings, a person skilled in the art can make various modifications and variations without departing from the spirit and scope of the present invention, and such modifications and variations fall within the scope of the appended claims. Although the embedment of the present invention is described with reference to the accompanying drawings, a person skilled in the art can make various modifications and variations without departing from the spirit and scope of the present invention, and such modifications and variations fall within the scope of the appended claims.

INDUSTRIAL APPLICABILITY

A general padding image processing method of a convolution internet algorithm, implementing the padding operation in either the software system or the hardware system, has issues of repeated occupation to a central process unit (CPU) or hardware calculation resources, and complicated encoding for soft and hardware codes. The present invention provides an image processing method, a device and a computer readable storage medium thereof to reduce repeated occupation to calculation source of a CPU or hardware, simplify encoding of codes, and increase operation speed.

What is claimed is:

1. An image processing method based on a convolution internet algorithm, comprising:
   determining a padding radius required by each of convolution calculation layers, wherein the convolution calculation layers are at least two;
   calculating a sum of the padding radiuses of the convolution calculation layers;
   acquiring an input image of a convolution internet algorithm;
   padding the input image for one time and acquiring a padded image according to the sum of the padding radiuses;
   determining a calculation range of each of the convolution calculation layers;
   implementing, according to a first one of the convolution calculation layers and one of the calculation ranges corresponding to the first one, a convolution internet algorithm calculation to the padded image, and then acquiring an image;

sequentially implementing, according to a rest of the convolution calculation layers other than the first one and the calculation ranges corresponding to the rest of the convolution calculation layers, convolution internet algorithm calculations to the image acquired by implementing the convolution internet algorithm calculation, and acquiring images acquired by sequentially implementing the convolution internet algorithm calculations; and employing the image acquired by implementing the convolution internet algorithm calculation according to the last one of the convolution calculation layers as an output image, and outputting the output image.

2. The image processing method as claimed in claim 1, wherein the step of determining the padding radius required by each of the convolution calculation layers comprises a step of analyzing the convolution internet algorithm.

3. The image processing method as claimed in claim 1, wherein the step of determining the calculation range of each of the convolution calculation layers comprises determining the calculation range according to the padded image acquired by padding the input image for one time.

4. The image processing method as claimed in claim 1, wherein the step of determining the calculation range of each of the convolution calculation layers comprises determining the calculation range according to the padding radius required by each of the convolution calculation layers and/or the input image.

5. An image processing device based on a convolution internet algorithm, comprising:
- a padding radius calculation module configured to determine a padding radius required by each of convolution calculation layers, wherein the convolution calculation layers are at least two;
- a pre-padding radius calculation module configured to calculate a sum of the padding radiuses of the convolution calculation layers;
- an image input module configured to acquire an input image of a convolution internet algorithm;
- a pre-padding module configured to pad the input image for one time and acquire a padded image according to the sum of the padding radiuses;
- a calculation range determination module configured to determine a calculation range of each of the convolution calculation layers;
- a convolution internet calculation module configured to implement, according to a first one of the convolution calculation layers and one of the calculation ranges corresponding to the first one, a convolution internet algorithm calculation to the padded image, and then acquire an image, and configured to sequentially implement, according to a rest of the convolution calculation layers other than the first one and the calculation ranges corresponding to the rest of the convolution calculation layers, convolution internet algorithm calculations to the image acquired by implementing the convolution internet algorithm calculation, and acquiring images acquired by sequentially implementing the convolution internet algorithm calculations; and
- an image output module configured to employ the image acquired by implementing the convolution internet algorithm calculation according to the last one of the convolution calculation layers as an output image, and to output the output image.

6. The image processing device based on the convolution internet algorithm as claimed in claim 5, wherein a step of determining the padding radius required by each of the convolution calculation layers, performed by the padding radius calculation module, comprises analyzing the convolution internet algorithm.

7. The image processing device based on the convolution internet algorithm as claimed in claim 5, wherein a step of determining the calculation range of each of the convolution calculation layers, performed by the calculation range determination module, comprises determining the calculation range according to the padded image acquired by padding the input image for one time.

8. The image processing device based on the convolution internet algorithm as claimed in claim 5, wherein a step of determining the calculation range of each of the convolution calculation layers, performed by the calculation range determination module, comprises determining the calculation range according to the padding radius required by each of the convolution calculation layers and/or the input image.

9. An electronic apparatus, comprising a processor, a communication interface, a memory, and a communication bus, wherein the processor, the communication interface, and the memory completes communication therebetween through the communication bus;
wherein the memory is configured to store computer programs;
wherein the processor is configured to implement the computer programs stored in the memory to achieve the steps of the method as claimed in claim 1.

10. A non-transitory computer readable storage medium, wherein the computer readable storage medium stores instructions, when operating on a computer, the computer readable storage medium drives the computer implement the image processing method as claimed in claim 1.

* * * * *